United States Patent [19]
Suzuki et al.

[11] Patent Number: 5,178,044
[45] Date of Patent: Jan. 12, 1993

[54] TRACTION CONTROL UPON START-UP OF AUTOMOBILE WITH CONTINUOUSLY VARIABLE TRANSMISSION

[75] Inventors: Yutaka Suzuki; Seiji Kaminaga, both of Kanagawa, Japan

[73] Assignee: Nissan Motor Co., Ltd., Yokohama, Japan

[21] Appl. No.: 718,448

[22] Filed: Jun. 20, 1991

[30] Foreign Application Priority Data

Jun. 21, 1990 [JP] Japan .................. 2-163453

[51] Int. Cl.$^5$ ...................... F16H 61/00; F16H 57/46
[52] U.S. Cl. .................. 74/866; 364/426.02; 364/424.1; 474/18
[58] Field of Search ............ 74/866; 474/11, 18; 364/426.03, 426.02, 424.1; 180/197

[56] References Cited
U.S. PATENT DOCUMENTS

| 4,735,113 | 4/1988 | Yamamuro et al. | 74/866 |
| 4,778,025 | 10/1988 | Sakaguchi et al. | 180/197 |
| 4,885,693 | 12/1989 | Imanaka et al. | 180/197 X |
| 5,046,009 | 9/1991 | Abo et al. | 364/426.02 |
| 5,047,940 | 9/1991 | Onaka et al. | 364/426.03 |
| 5,060,746 | 10/1991 | Nobumoto et al. | 364/426.02 X |
| 5,075,860 | 12/1991 | Suzuki | 364/424.1 |

FOREIGN PATENT DOCUMENTS

| 0180109 | 5/1988 | European Pat. Off. |
| 4025455A1 | 3/1991 | Fed. Rep. of Germany |
| 58-94667 | 6/1983 | Japan |
| 63-172058 | 7/1988 | Japan |
| 64-36532 | 2/1989 | Japan |
| 3734 | 1/1990 | Japan ................ 180/197 |

Primary Examiner—Leslie A. Braun
Assistant Examiner—Khoi Q. Ta
Attorney, Agent, or Firm—Foley & Lardner

[57] ABSTRACT

A traction control of an automobile with a continuously variable transmission is provided. According to this control, in order to improve start-up ability of the vehicle on a road surface with a low friction coefficient, a wheel acceleration is derived and when the wheel acceleration is greater than a predetermined value, the tendency of the transmission to upshift is increased.

8 Claims, 7 Drawing Sheets

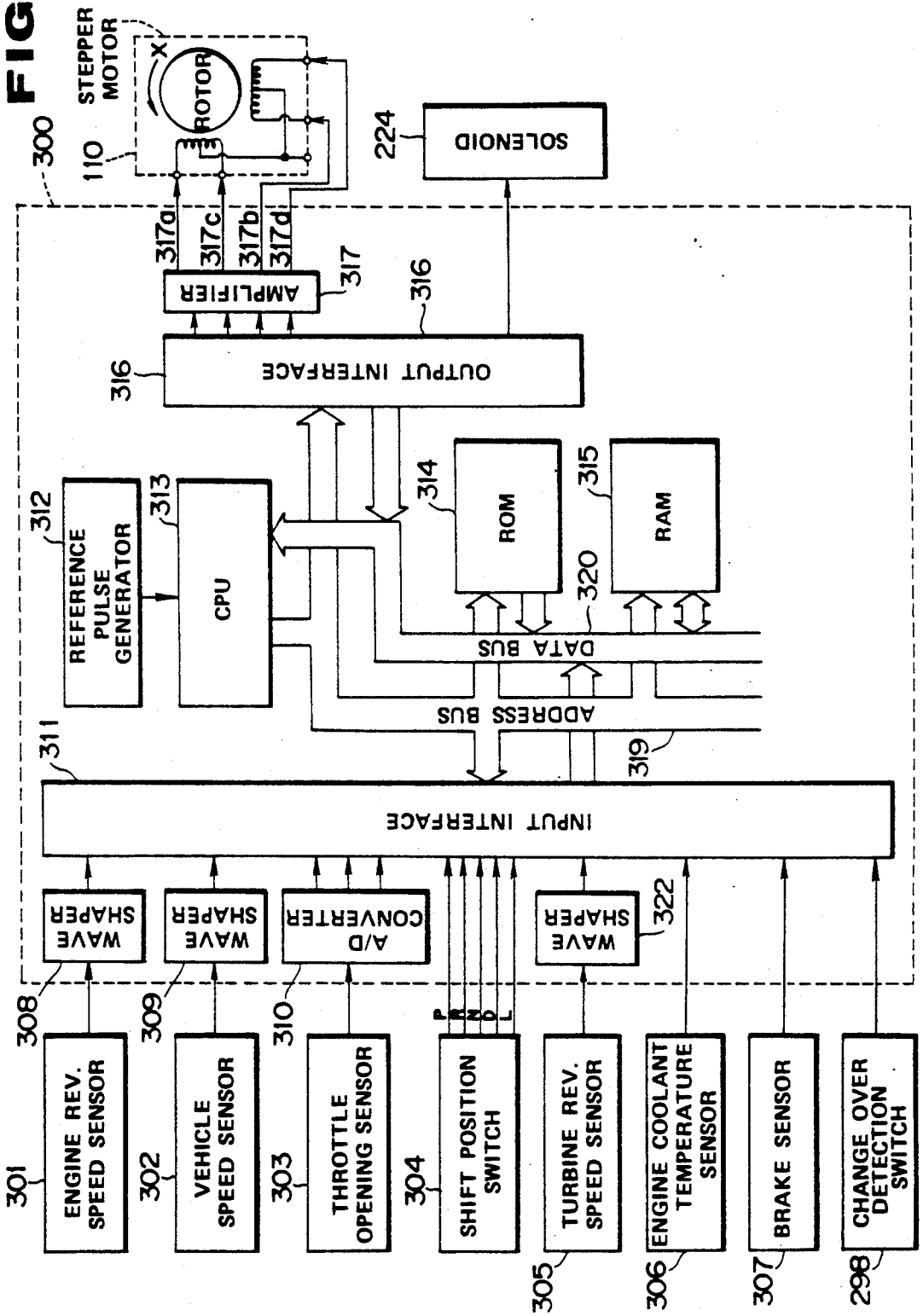

TRACTION CONTROL UPON START-UP OF AUTOMOBILE WITH CONTINUOUSLY VARIABLE TRANSMISSION

BACKGROUND OF THE INVENTION

The present invention relates to a ratio control of a continuously variable transmission of an automobile, and more particularly to a traction control by appropriately setting a reduction ratio upon the vehicle starting from a standstill on a road with a low friction coefficient.

Japanese patent application First (unexamined) Publication No. 64-36532 discloses a continuously variable transmission provided with a manual selector switch. According to this continuously variable transmission, if he/she recognizes that a road has a low friction coefficient, the driver places this switch to a predetermined position, causing the transmission to establish a predetermined reduction ratio smaller than the maximum reduction ratio.

An object of the present invention is to improve a ratio control of a continuously variable transmission such that the transmission automatically selects an appropriate reduction ratio for a road condition.

SUMMARY OF THE INVENTION

According to one aspect of the present invention, there is provided an automotive vehicle, comprising:
an engine;
a continuously variable transmission having an input member drivingly connected to said engine and an output member;
a driving wheel drivingly connected to said output member;
means for detecting a revolution speed of said input member and for generating an input revolution speed indicative signal indicative of said revolution speed of said input member detected; and
means for detecting a revolution speed of said output member for generating a driving wheel revolution speed indicative signal indicative of said revolution speed of said output member detected;
wherein a driving wheel acceleration of said driving wheel is determined on said driving wheel revolution speed indicative signal, and said continuously variable transmission upshifts when said driving wheel acceleration becomes equal to or greater than a predetermined acceleration value.

According to another aspect of the present invention, there is provided a method of a traction control of an automotive vehicle having an engine, a continuously variable transmission and a driving wheel, the continuously variable transmission including an input member drivingly connected to the engine and an output member drivingly connected to the driving wheel, the method comprising the steps of:
detecting a revolution speed of the input member and generating an input revolution speed indicative signal indicative of said revolution speed of said input member detected;
detecting a revolution speed of the output member and generating a driving wheel revolution speed indicative signal indicative of said resolution speed of the output member detected;
determining a driving wheel acceleration of the driving wheel based on said driving wheel revolution speed indicative signal; and
causing the continuously variable transmission to upshift when said driving wheel acceleration becomes equal to or greater than a predetermined acceleration value.

BRIEF DESCRIPTION OF THE DRAWINGS

FIG. 3 is a block diagram of a control unit for the electro-hydraulic circuit;

DETAILED DESCRIPTION OF THE INVENTION

Referring to FIGS. 1, 2A, 2B, and 3, reference is made to Yamamuro et al U.S. Pat. No. 4,735,113 issued on Apr. 5, 1988 which is hereby incorporated by reference in its entirety. Specifically, reference is made to FIG. 2, 1A, 1B, and 3 of this known patent since they correspond to FIGS. 1, 2A, 2B, and 3 of this application. This U.S. Patent corresponds to EP-A 0180209 published on May 7, 1986, which EP publication is hereby incorporated by reference in its entirety. In understanding FIGS. 1, 2A, 2B, and 3, reference is also made to copending U.S. patent application Ser. No. 07/563,309 (now U.S. Pat. No. 5,067,372 issued on Nov. 26, 1991) filed on Aug. 7, 1990, which application is hereby incorporated by reference in its entirety. This copending U.S. patent application corresponds to German patent application Ser. No. P 4025455.0 filed on Aug. 10, 1990, now DE 40 25 455 A1 published on Mar. 14, 1991.

Figure 1:
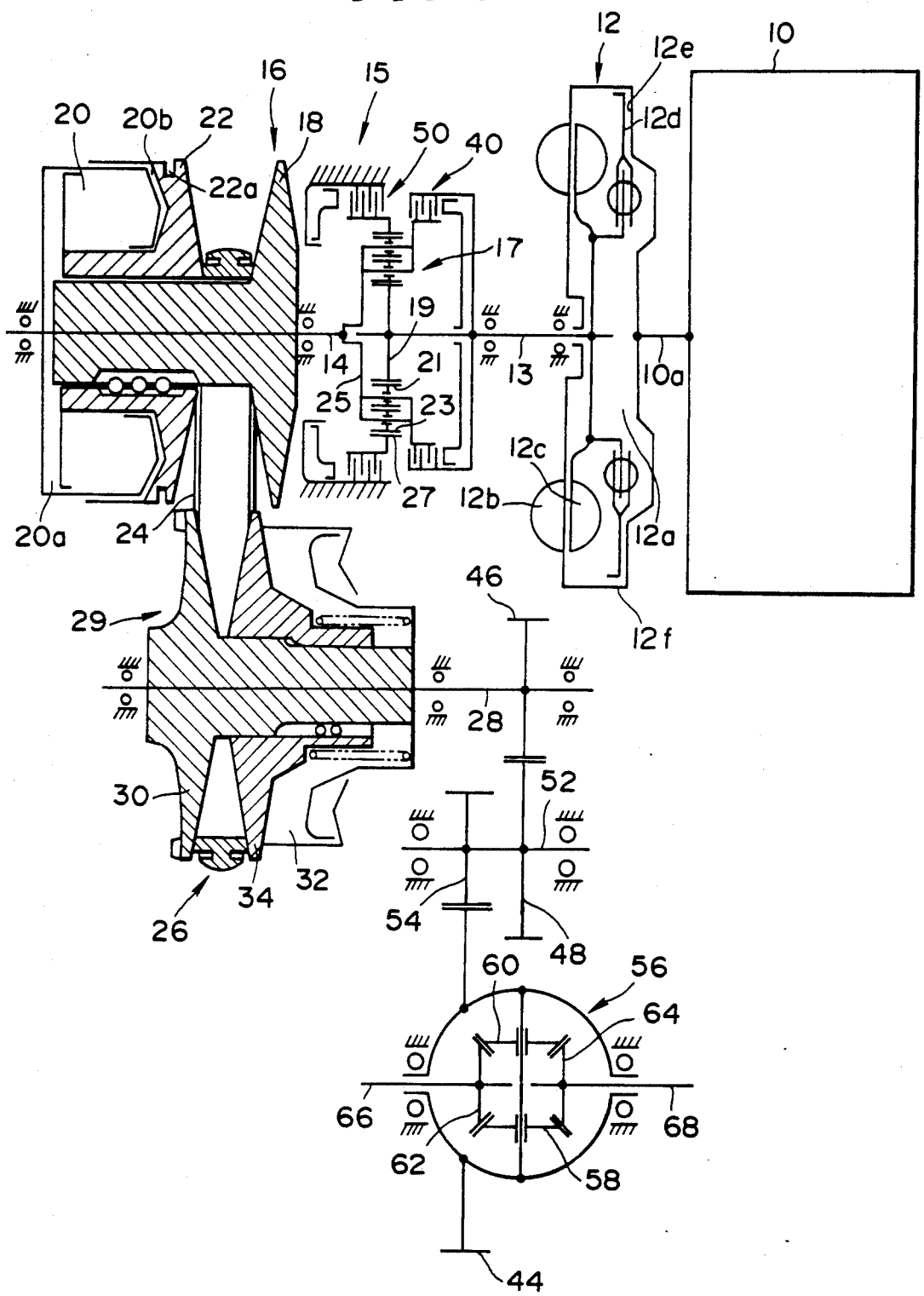
FIG. 1 is a schematic diagram of a motor vehicle with an engine followed by a hydrokinetic torque transmitting unit with a lock-up clutch and an automatic transmission.

Referring to FIG. 1, there is shown a portion of an automotive vehicle. The vehicle includes an engine 10 with a throttle which opens in degrees as an accelerator pedal or a gas pedal is depressed, a hydrokinetic torque transmitting unit in the form of a fluid coupling 12, a forward/reverse drive change-over mechanism 15, a driver pulley 16, a follower pulley 26, a V-belt 24, and a differential 56. The fluid coupling 12 includes a pump impeller 12c coupled with the engine 10 at its output shaft 10a, and a turbine runner 12b coupled with a turbine shaft 13 which is in turn coupled with the forward/reverse drive change-over mechanism 15. The fluid coupling 12 includes a lock-up mechanism, namely, a lock-up clutch, which is hydraulically actuable.

Figure 2A:
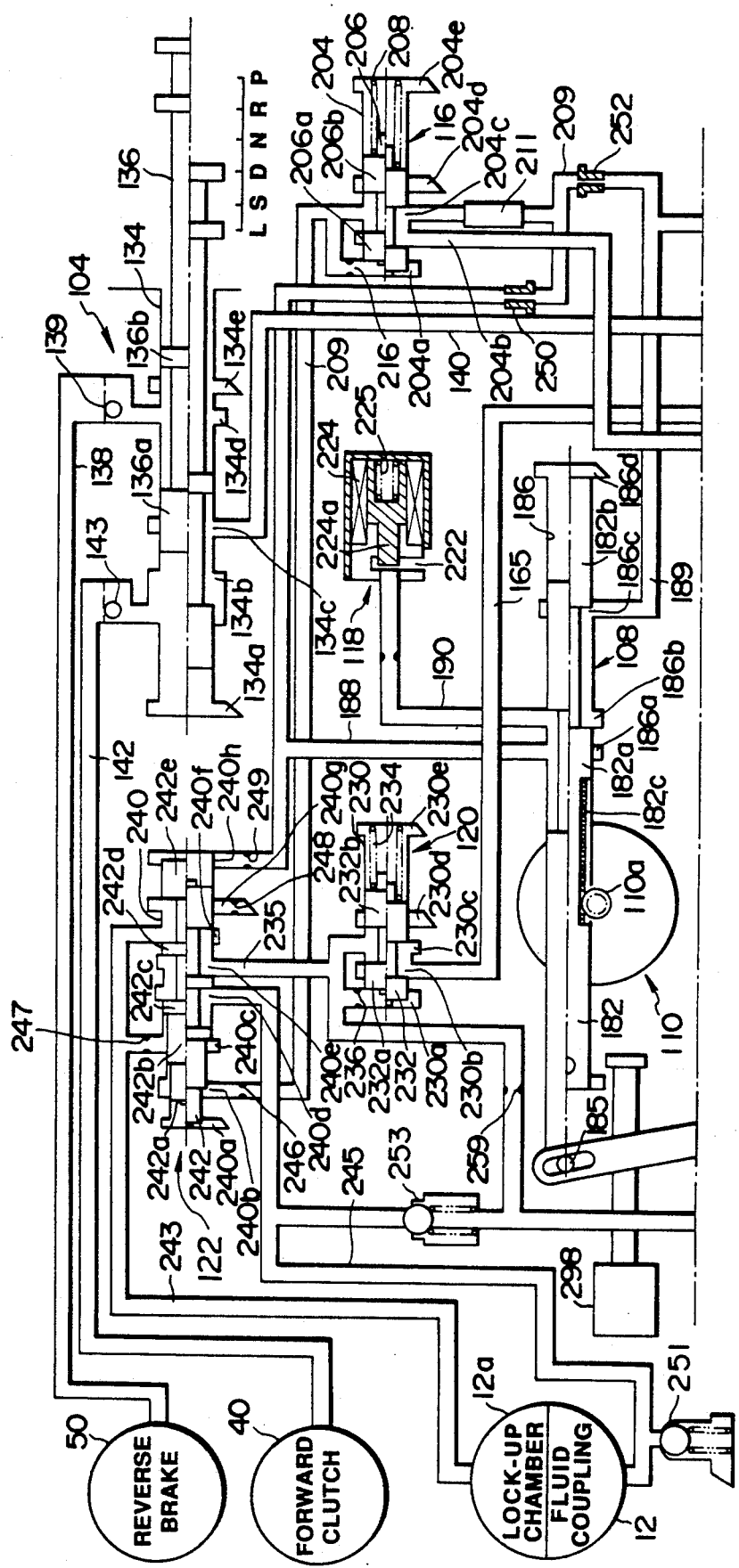
FIGS. 2A and 2B, when combined, illustrate an electro-hydraulic circuit for the automatic transmission.
Figure 2B:
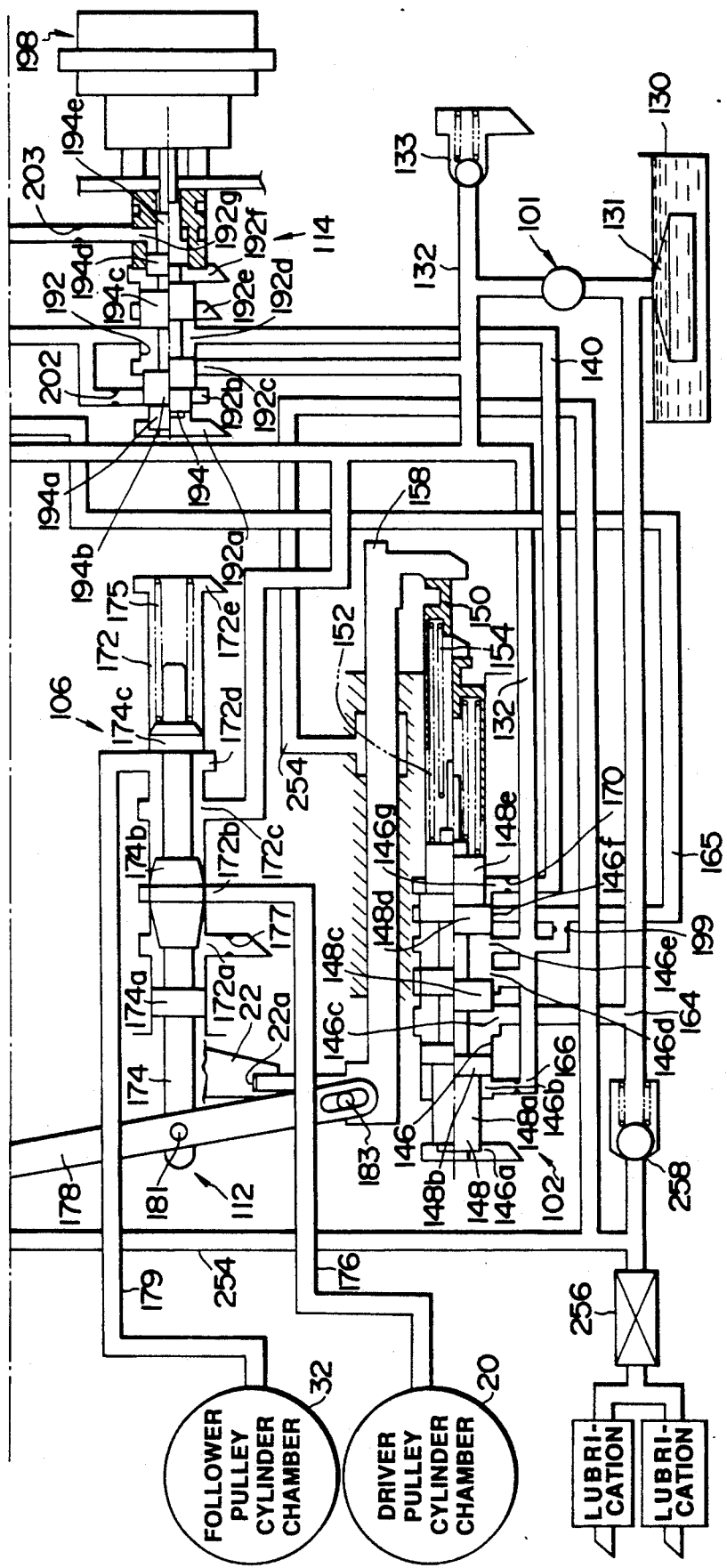

Referring to FIGS. 2A and 2B, a lock-up control valve 122, an electromagnetically operated valve 118 including a solenoid 224, a throttle valve 114, and a shift command valve 108 are shown. The lock-up control valve 122 has a lock-up position as illustrated by an upper half thereof viewing in FIG. 2A and a lock-up release position as illustrated by a lower half thereof viewing in FIG. 2A. It assumes one of the two positions under the control of the electromagnetically operated valve 118. The throttle valve 114 generates a throttle pressure which is supplied selectively to a forward clutch 40 for a forward drive or a reverse brake 50 for a reverse drive. The magnitude of the throttle pressure is adjustable or variable by the electromagnetically operated valve 118. The electromagnetically operated valve 118 is connected to the lock-up control valve 122 or the throttle valve 114, selectively, under the control of the shift command valve 108. The shift command valve 108 has a spool 182 longitudinally movable by a shift motor in the form of a stepper motor 110. The spool 182 is movable within a normal stroke range between a minimum reduction ratio position and also movable beyond the maximum reduction ratio position into an overstroke range next adjacent to the normal stroke range. The spool 182 is formed with two axially spaced lands 182a and 182b which function to connect the electromagnetically operated valve 118 to the lock-up control valve 122 to subject the lock-up control valve 122 to a hydraulic pressure signal generated by the electromagnetically operated valve 118 during movement of the spool 182 within the normal stroke range and to disconnect the electromagnetically operated valve 118 from the lock-up control valve 122 during movement of the spool within the overstroke range. During movement of the spool 182 within the normal stroke range, the lands 182a and 182b on the spool 182 function to disconnect the electromagnetically operated valve 118 from the throttle valve 114, while during movement of the spool 182 within the overstroke range, the lands 182a and 182b on the spool 182 function to connect the electromagnetically operated valve 118 to the throttle valve 114. A constant pressure regulator valve 116 generates a constant hydraulic pressure. This constant hydraulic pressure is allowed to act via a signal pressure port 240b on the lock-up control valve 122 when the electromagnetically operated valve 118 is disconnected from the lock-up control valve 122 during movement of the spool 182 within the overstroke range to keep the lock-up control valve 122 at the lock-up release position, causing the lock-up mechanism of the fluid coupling 12 to assume the lock-up release state. Upon or immediately after a driver's demand for moving the vehicle from a standstill, the spool 182 of the shift command valve 108 moves from the overstroke range to the maximum reduction ratio position of the normal stroke range to connect the electromagnetically operated valve 118 to the lock-up control valve 122. Subsequently, the lock-up control valve 122 is allowed to shift between the lock-up release position and the lock-up position under the control of the electromagnetically operated valve 118. The electromagnetically operated valve 118 holds the lock-up control valve 122 in the lock-up release position until the vehicle speed exceeds a lock-up vehicle speed value, and subsequently shifts the lock-up control valve 122 to the lock-up position when the vehicle speed exceeds the lock-up vehicle speed value.

Briefly explaining the manner of a ratio shift control, a shift control valve 106 regulates the supply of hydraulic fluid to and discharge thereof from a driver pulley cylinder chamber 20 of the driver pulley 16 in response to movement of the spool 82. The pressure of the hydraulic fluid within the follower pulley cylinder chamber 32 of the follower pulley 26 is not affected by the shift control valve 106 and is kept as high as a line pressure generated by a line pressure regulator valve 102.

The line pressure is used in pressure regulation effected by the shift control valve 106. The shift control valve 106 includes a spool 174 which is actuated via a shift operation mechanism 112 by the stepper motor 110. The output of the shift control valve 106 is supplied to a driver pulley cylinder chamber 20. The pressure level within the driver pulley cylinder chamber 20 is zero to establish the maximum reduction ratio in the transmission. Increasing the pressure within the driver pulley cylinder chamber 20 causes an upshift from the maximum reduction ratio, resulting in a drop in engine revolution speed. The stepper motor 110 is controlled by the control unit 300.

As shown in FIG. 3, the control unit 300 receives signals from an engine revolution speed sensor 301, a vehicle speed sensor 302, a throttle opening degree sensor 303, and a turbine revolution speed sensor 305. It also receives signals from a shift position switch 304, an engine coolant temperature sensor 306, a brake sensor 307 and a change over detection switch 298. The engine revolution speed sensor 301 detects a revolution speed of the engine 10 and generates an engine revolution speed indicative signal indicative of the engine revolution speed detected. The vehicle speed sensor 302 detects a revolution speed of an output shaft 28 and generates a vehicle speed indicative signal indicative of the revolution speed detected. The throttle opening degree sensor 303 detects an opening degree of the engine throttle, as a variable representative of the engine load, and generates a throttle opening degree indicative signal indicative of the throttle opening degree detected. The turbine revolution speed sensor 305 detects a revolution speed of the turbine shaft 13 and generates an input revolution speed indicative signal indicative of the turbine revolution speed detected. These signals are fed to the control unit 300 along with the other sensor and switch outputs.

Figure 5:
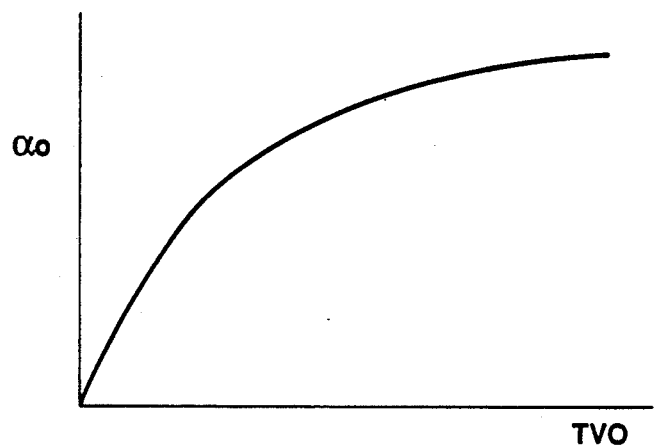
FIG. 5 is a diagram illustrating a function of $\alpha_0$ (alpha zero) versus TVO.
Figure 6:
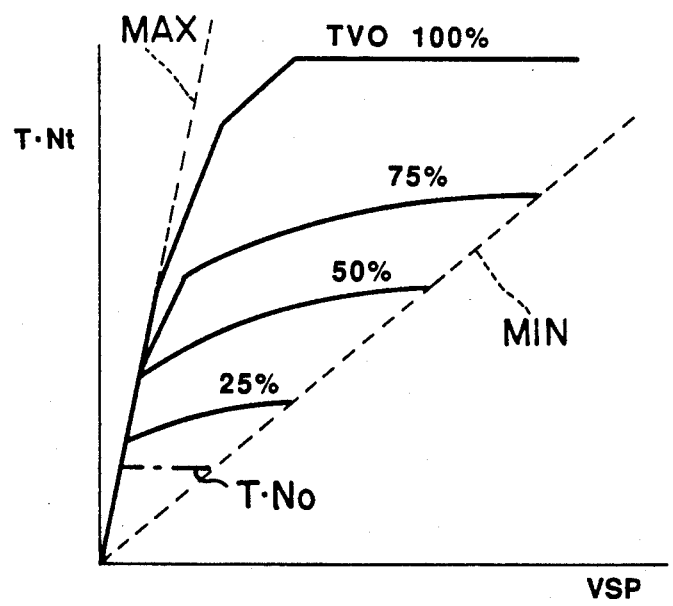
FIG. 6 is a diagram illustrating T·Nt versus VSP for different TVO.

Referring to FIG. 6, the principle of operation of this embodiment is explained. In FIG. 6, a family of fully drawn curves illustrates a mapping data, g(TVO,VSP), which is to be retrieved based on a throttle opening degree TVO and a vehicle speed VSO. In FIG. 6, a broken straight line MAX is drawn to interconnect operation points at which the maximum reduction ratio is maintained, while a broken straight line MIN is drawn to interconnect operation points at which the minimum reduction ratio is maintained. According to this control strategy, the maximum reduction ratio is maintained to allow a swift increase in the engine revolution speed at low vehicle speeds to produce a driving force large enough to move the vehicle from a standstill. This control strategy will suffice unless a traction is lost. According to this embodiment, in order to make it easy for the vehicle to start from a standstill on a road with a low friction coefficient, an increase in target input revolution speed T·Nt given from the mapping data of FIG. 6 is leveled off at a predetermined value T·No upon detection of an occurrence of a predetermined degree of wheel slip. In accordance with this modified control strategy, the transmission initiates an upshift from the maximum reduction ratio at an earlier stage than would ordinarily occur upon detection of the predetermined degree of wheel slip. The setting is such that the above-mentioned predetermined value T·No is lower than an input revolution speed value which is usually used upon starting of the vehicle from a standstill. The larger the throttle opening degree, the larger the above-mentioned degree of wheel slip is. This relationship is illustrated in FIG. 5.

Figure 4:
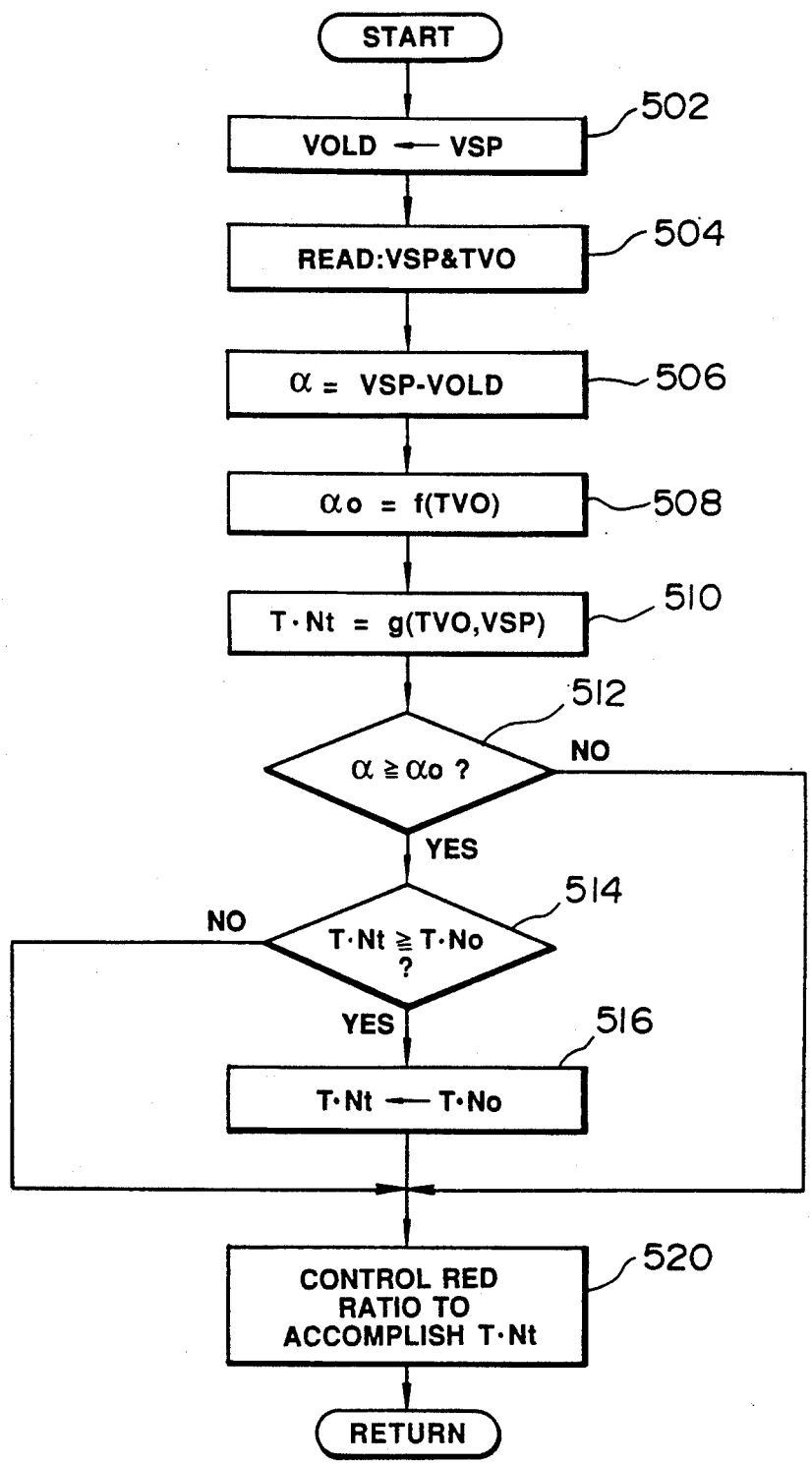
FIG. 4 is a flow diagram for explaining the operation of a first embodiment.

Referring to FIG. 4, the flow diagram of this operation is explained. This flow diagram shows a sub-routine of a main routine.

In FIG. 4, at a step 502, a stored vehicle speed data VSP is stored as VOLD. At the subsequent step 504, reading operations of outputs of the vehicle speed sensor 302 and throttle opening sensor 303 are performed to store the results as VSP and TVO. Thus, the vehicle speed data VSP is updated. At the next step 506, a wheel acceleration α(alpha) is calculated by subtracting VOLD from VSP. Then, at a step 508, a table look-up operation of the mapping data as illustrated in FIG. 5 based on TVO to give a predetermined acceleration value $α_o$. At a step 510, a table look-up operation of the mapping data as illustrated in FIG. 6 is performed based on TVO and VSP to give a target input revolution speed T·Nt. There is an interrogation at a step 512 whether or not the acceleration α is greater than or equal to the predetermined acceleration value $α_o$. If this results in a negative, a reduction ratio control is carried out (see block 520) using the data given at the step 510. If this inquiry results in affirmative, there is another interrogation at a decision step 514 whether or not T·Nt is greater than or equal to the predetermined value T·No. If this results in negative, the control proceeds to the block 520 where the data T·Nt stored at the step 510 is used unmodified. If the interrogation at the step 514 results in affirmative, T·No is stored as T·Nt at a step 516 and this modified data is used in the reduction ratio control at the block 520.

In the flow diagram, it is to be understood that the vehicle speed sensor 302 detects revolution speed of the transmission output member and thus the data α is indicative of a wheel acceleration of the driving wheel of the vehicle.

In the flow diagram shown in FIG. 4, the predetermined acceleration value α is set as a function of the TVO. Alternatively, this may be set as a function of VSP or a combination of VSP and TVO.

Figure 7:
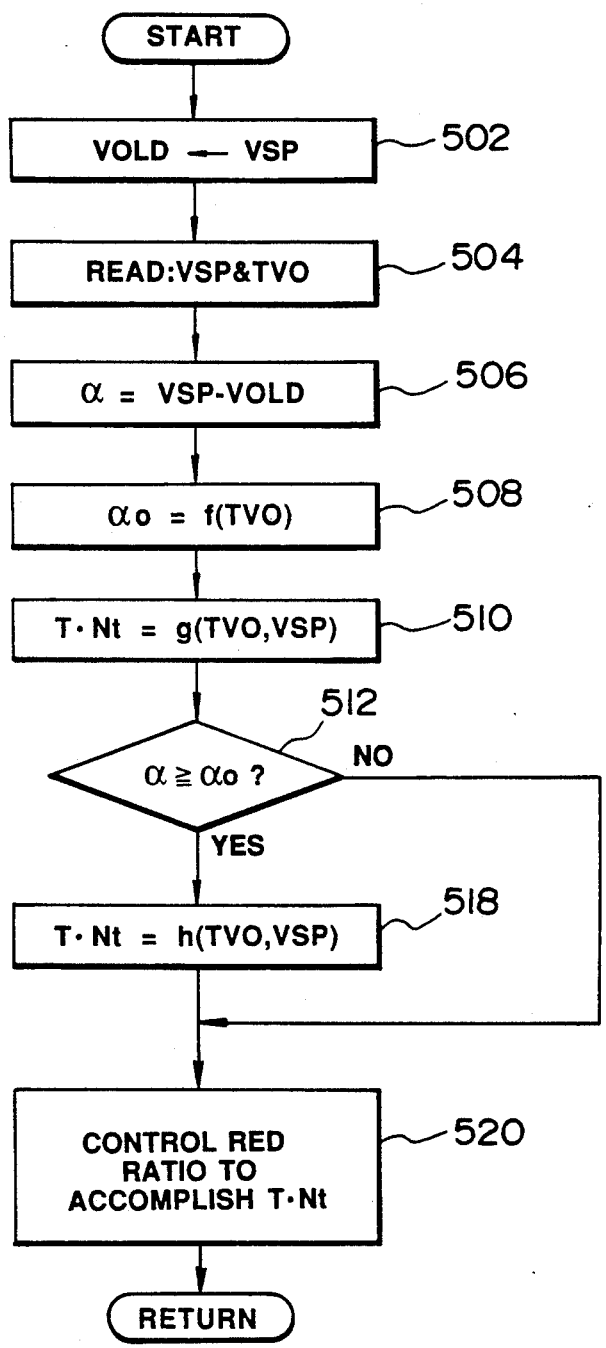
FIG. 7 is a flow diagram for explaining operation of a second embodiment.

FIG. 7 is a flow diagram of a second embodiment. In this embodiment, the data T·Nt stored at the step 510 is modified to a smaller value which is a function of TVO and VSO. Thus, the flow diagram shown in FIG. 7 is different from that shown in FIG. 4 only in the provision of a step 518 in the place of two steps 514 and 516 of FIG. 4.

What is claimed is:
1. An automotive vehicle, comprising:
an engine;
a continuously variable transmission having an input member drivingly connected to said engine and having an output member;
a driving wheel drivingly connected to said output member;
means for detecting a revolution speed of said input member and for generating an input revolution speed indicative signal indicative of said revolution speed of said input member detected; and
means for detecting a revolution speed of said output member and for generating a driving wheel revolution speed indicative signal indicative of said revolution speed of said output member detected;
wherein a driving wheel acceleration of said driving wheel is determined on the basis of said driving wheel revolution speed indicative signal, and a target input revolution speed at which said continuously variable transmission upshifts is modified when said driving wheel acceleration becomes equal to or greater than a predetermined acceleration value.

2. A method of a traction control of an automotive vehicle having an engine, a continuously variable transmission and a driving wheel, the continuously variable transmission including an input member drivingly connected to the engine and an output member drivingly connected to the driving wheel, the method comprising the steps of:
detecting a revolution speed of the input member and generating an input revolution speed indicative signal indicative of said revolution speed of said input member detected;
detecting a revolution speed of the output member and generating a driving wheel revolution speed indicative signal indicative of said revolution speed of the output member detected;
determining a driving wheel acceleration of the driving wheel base on said driving wheel revolution speed indicative signal; and
modifying a target input revolution speed at which said continuously variable transmission upshifts when said driving wheel acceleration becomes equal to or greater than a predetermined acceleration value.

3. A method as claimed in claim 2, wherein said predetermined acceleration value is variable with a predetermined engine load indicative operating variable.

4. A method as claimed in claim 2, wherein the continuously variable transmission is shiftable in reduction ratio in such a manner as to decrease a deviation of an actual value of a predetermined reduction ratio related variable from a target value of said predetermined reduction ratio related variable.

5. A method as claimed in claim 4, wherein, when said driving wheel acceleration becomes equal to or greater than a predetermined acceleration value, said target value is leveled off at a predetermined value.

6. A method as claimed in claim 4, wherein, when said driving wheel acceleration becomes equal to or greater than a predetermined acceleration value, said target value is variable as a function of predetermined engine load indicative and vehicle speed indicative variables.

7. A method of a traction control of an automotive vehicle having an engine, a continuously variable transmission, and a driving wheel, the continuously variable transmission including an input member drivingly connected to the engine and an output member drivingly connected to the driving wheel, the method comprising the steps of:
detecting a throttle valve opening degree of the engine and generating a throttle valve opening degree indicative signal indicative of said throttle valve opening degree detected;
detecting revolution speed of the input member and generating an input revolution speed indicative signal indicative of said revolution speed of said input member detected;
detecting a revolution speed of the output member and generating a driving wheel revolution speed indicative signal indicative of said revolution speed of the output member detected;
determining a driving wheel acceleration of the driving wheel based on said driving wheel revolution speed indicative signal and generating a driving wheel acceleration indicative signal indicative of said driving wheel acceleration determined;

determining a target value of said revolution speed of the input member as a predetermined function of said throttle valve opening degree indicative signal and said driving wheel revolution speed indicative signal and generating a target input revolution speed indicative signal indicative of said target value determined;

modifying said target input revolution speed indicative signal upon said target input revolution speed indicative signal being greater than or equal to a predetermined input revolution speed value when said driving wheel acceleration indicative signal is greater than or equal to a predetermined acceleration value and causing the continuously variable transmission to shift in reduction ratio so as to decrease a deviation of said input revolution speed indicative signal from said predetermined input revolution speed;

causing the continuously variable transmission to shift in reduction ratio so as to decrease a deviation of said input revolution speed indicative signal from said target input revolution speed indicative signal upon said target input revolution speed indicative signal being less than said predetermined input revolution speed value when said driving wheel acceleration indicative signal is greater than or equal to said predetermined acceleration value; and causing the continuously variable transmission to shift in reduction ratio so as to decrease a deviation of said input revolution speed indicative signal from said target input revolution speed indicative signal when said driving wheel acceleration indicative signal is less than said predetermined acceleration value.

8. A method of a traction control of an automotive vehicle having an engine, a continuously variable transmission, and a driving wheel, the continuously variable transmission including an input member drivingly connected to the engine and an output member drivingly connected to the driving wheel, the method comprising the steps of:

detecting a throttle valve opening degree of the engine and generating a throttle valve opening degree indicative signal indicative of said throttle valve opening degree detected;

detecting a revolution speed of the input member and generating an input revolution speed indicative signal indicative of said revolution speed of said input member detected;

detecting a revolution speed of the output member and generating a driving wheel revolution speed indicative signal indicative of said revolution speed of the output member detected;

determining a target value of said revolution speed of the input member as a predetermined function of said throttle valve opening degree indicative signal and said driving wheel revolution speed indicative signal and generating a target input revolution speed indicative signal indicative of said target value determined;

determining a driving wheel acceleration of the driving wheel based on said driving wheel revolution speed indicative signal and generating a driving wheel acceleration indicative signal indicative of said driving wheel acceleration determined;

modifying said target input revolution speed indicative signal when said driving wheel acceleration indicative signal is greater than or equal to a predetermined acceleration value and causing the continuously variable transmission to shift in reduction ratio so as to decrease a deviation of said input revolution speed indicative signal from said modified target input revolution speed indicative signals; and causing the continuously variable transmission to shift in reduction ratio so as to decrease a deviation of said input revolution speed indicative signal from said target input revolution speed indicative signal when said driving wheel acceleration indicative signal is less than said predetermined acceleration value.

* * * * *